UNITED STATES PATENT OFFICE.

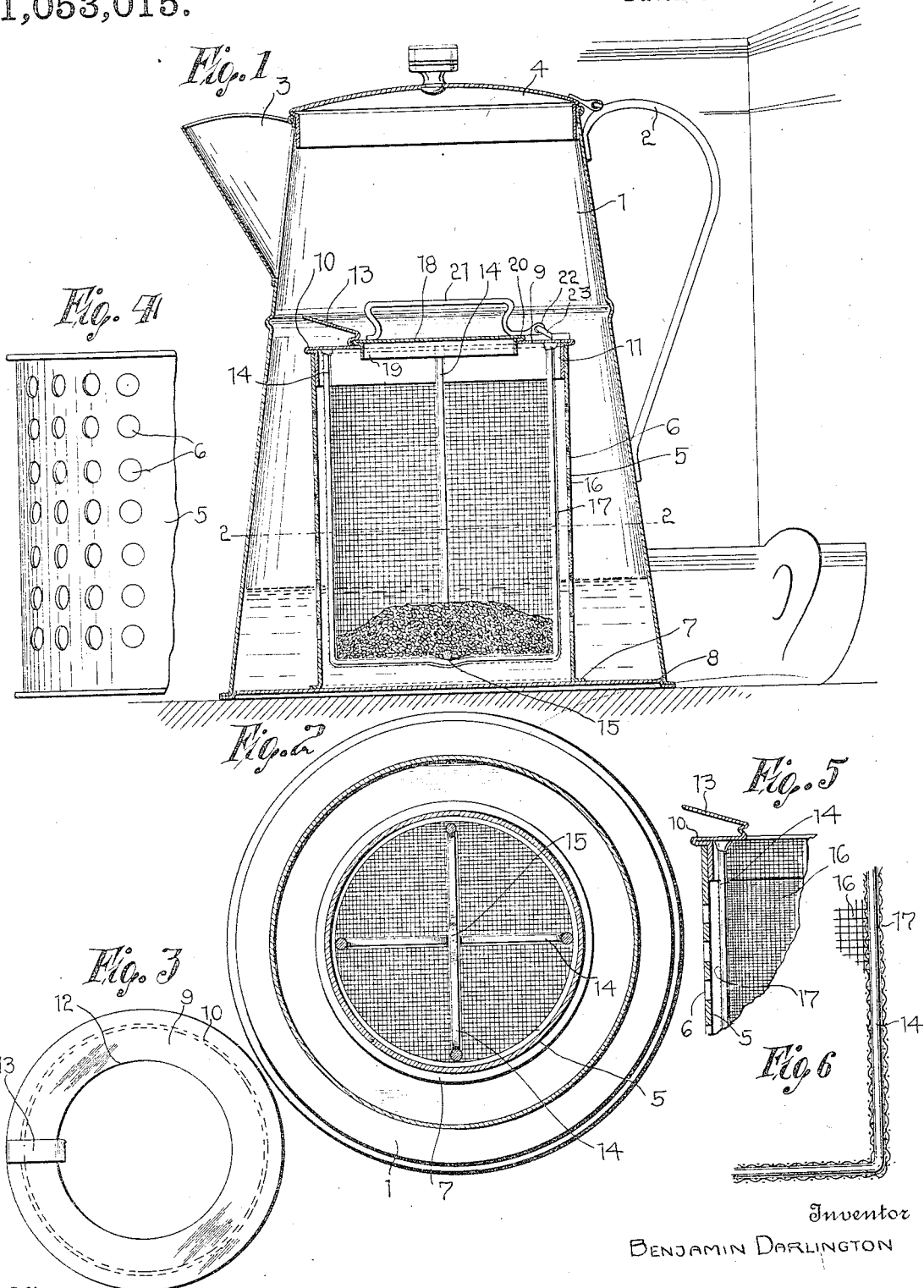

BENJAMIN DARLINGTON, OF VAUGHAN, WEST VIRGINIA.

COFFEE-POT ATTACHMENT.

1,053,015.

Specification of Letters Patent. Patented Feb. 11, 1913.

Application filed January 13, 1912. Serial No. 671,050.

*To all whom it may concern:*

Be it known that I, BENJAMIN DARLINGTON, a citizen of the United States, residing at Vaughan, in the county of Nicholas and State of West Virginia, have invented certain new and useful Improvements in Coffee-Pot Attachments, of which the following is a specification, reference being had therein to the accompanying drawing.
This invention relates to coffee pots and the principal object of the same is to provide a receptacle mounted in the coffee pot whereby a percolator may be mounted in the coffee pot.
A second object of the invention is to construct the percolator in such a manner that it can be readily withdrawn from the receptacle and to construct the receptacle so that communication is permitted between the receptacle and the body of the coffee pot.

This invention is illustrated in the accompanying drawings, wherein:—

Figure 1 is a view in vertical section through a coffee pot having the improved percolator mounted therein. Fig. 2 is a cross section along the line 2—2 in Fig. 1. Fig. 3 is a top plan view of the receptacle. Fig. 4 is a side view of one portion of the receptacle. Fig. 5 is a fragmentary view of the upper portion of the receptacle and percolator and illustrates the manner of forming the catch. Fig. 6 is an enlarged sectional view of the bottom portion of the percolator.

Referring to the accompanying drawings by numerals it will be seen that this invention comprises a body portion 1 having a handle 2, an outlet spout 3, and a cover 4.
A receptacle 5 is provided with openings 6 and has a flange 7 formed at its lower end by means of which the receptacle may be secured to the bottom 8 of the coffee pot. It will thus be seen that due to the openings 6 communication is permitted between the interior of the coffee pot and the interior of the receptacle.

The percolator comprises a supporting frame 9 which has its outer portion crimped to form a supporting ledge 10 and a depending flange 11 which fits into the upper portion of the receptacle, the ledge 10 resting upon the upper edge of the receptacle and supporting the frame. The frame is provided with a central opening 12 and has a tongue struck from the central portion and bent back to form a spring catch 13.

Wires 14 are secured to the under face of the frame 9 adjacent the depending flange 11 and form supporting bars for the body portion of the percolator. The wires are each substantially U-shaped in cross section and have their central portions crossed as shown in Fig. 2. Each of the wires has its central portion curved to form a seat 15 so that the wires will be prevented from moving out of position. A fabric lining 16 and a fabric covering 17 are mounted upon the supporting wires 14 and thus form a receptacle wherein the coffee may be placed and which will permit water to circulate freely through the coffee, but will prevent grounds from passing from the percolator into the body portion of the coffee pot. It should be noted that the openings 6 formed in the receptacle 5 commence at a considerable distance from the bottom of the pot so that if by chance fine grounds escape from the percolator they will settle in the receptacle and not pass out into the pot. A cover 18 which has its outer portion crimped to form a depending flange 19 and an overhanging ledge 20 fits into the opening 12 with the ledge engaged by the catch 13. A handle 21 is secured to the cover 18 and has one end formed into a hinge ear 22 whereby the cover may be mounted upon a staple 23 secured to the frame 9.

In using this device, the coffee is placed in the percolator and a desired amount of water placed in the coffee pot. The percolator is inserted in the receptacle and the coffee pot placed upon the stove. As the water boils it passes freely through the receptacle and percolator and gathers strength from the coffee. When the coffee has boiled a sufficient amount the percolator may be left in the receptacle or if desired may be withdrawn by means of the handle 21. It should be noted that the catch 13 engages the cover to such an extent that the cover cannot be released without springing the catch from its normal position. It should also be noted that by having the receptacle constructed as described there are no crevices in which dirt and used coffee grounds could collect.

What I claim as my invention is:—

In a coffee pot attachment, a receptacle, a frame fitting within said receptacle, supporting bars carried by said frame, a fabric covering for said supporting bars, said frame being provided with a central opening, a cover for said opening, and a handle mounted upon said cover and having one portion formed into a hinge ear whereby said cover may be hinged to said frame.

In testimony whereof I hereunto affix my signature in presence of two witnesses.

BENJAMIN DARLINGTON.

Witnesses:
J. C. DUNBAR,
J. H. MOORE.